United States Patent [19]
Yoshimizu

[11] Patent Number: 5,329,388
[45] Date of Patent: Jul. 12, 1994

[54] LIQUID CRYSTAL DISPLAY EMPLOYING LIGHT GUIDE PLATE BETWEEN CELLS

[75] Inventor: Toshiyuki Yoshimizu, Ikoma, Japan

[73] Assignee: Sharp Kabushiki Kaisha, Osaka, Japan

[21] Appl. No.: 911,696

[22] Filed: Jul. 10, 1992

[30] Foreign Application Priority Data

Jul. 15, 1991 [JP] Japan ................................ 3-173976

[51] Int. Cl.⁵ .................... G02F 1/1335; G02F 1/133
[52] U.S. Cl. .......................................... 359/53; 359/42
[58] Field of Search ................ 359/40, 41, 42, 53, 359/63, 64

[56] References Cited

U.S. PATENT DOCUMENTS

| | | | |
|---|---|---|---|
| 4,653,863 | 3/1987 | Ito et al. | 359/66 |
| 4,735,495 | 4/1988 | Henkes | 359/49 |
| 4,824,216 | 4/1989 | Perbet et al. | 359/42 |
| 4,917,465 | 4/1990 | Conner et al. | 350/335 |
| 5,122,887 | 6/1992 | Mathewson | 359/53 |
| 5,148,297 | 9/1992 | Ishii et al. | 359/53 |
| 5,159,478 | 10/1992 | Akiyama et al. | 359/69 |

FOREIGN PATENT DOCUMENTS

| | | |
|---|---|---|
| 0408036 | 1/1991 | European Pat. Off. |
| 0466497 | 1/1992 | European Pat. Off. |
| 0169130 | 10/1983 | Japan |

OTHER PUBLICATIONS

"High-Resolution Display System Based on Stacked Mutually Compensated STN-LCD Layers", Conne et al, Digest of the SID 1991, pp. 755-757.

"Catalogue of Industrial Optics", Sumitomo Three M. Kubushiki Kaisha Industrial Optics.

Primary Examiner—William L. Sikes
Assistant Examiner—Kenneth Parker
Attorney, Agent, or Firm—Nixon & Vanderhye

[57] ABSTRACT

In a liquid crystal display system constructed from a plurality of liquid crystal display cells stacked one on top of another, a light guide adapted to transmit light only in a direction perpendicular to the display surfaces of the liquid crystal display cells is interposed between the first liquid crystal display cell disposed nearest to an observer and the second liquid crystal display cell disposed behind the first liquid crystal display cell. Because of the provision of the light guide, the images formed on the second and third liquid crystal display cells are focused through the light guide onto the rear surface of the first liquid crystal display cell, viewed from the direction of the observer. The light guide is a sheet of optical fibers or a stack of sheet like members separated by refletion films, the plane of which are perpendicular to the plane of the display.

15 Claims, 6 Drawing Sheets

LIGHT

FIG. 2B

LIGHT

LIQUID CRYSTAL DISPLAY EMPLOYING LIGHT GUIDE PLATE BETWEEN CELLS

BACKGROUND OF THE INVENTION

1. Field of the Invention

The present invention relates to a stacked liquid crystal display system for forming an image, for example, a color image, by superposing images displayed on a plurality of liquid crystal display cells.

2. Description of the Related Art

There have previously been proposed a variety of liquid crystal display systems for forming an image by superposing images displayed on a plurality of liquid crystal display cells. One such system is constructed by stacking component members one on top of another, in the order of a first polarizer, a first STN (supertwisted nematic) liquid crystal cell, a second polarizer, a second STN liquid crystal cell, a third polarizer, a third STN liquid crystal cell, and a fourth polarizer (U.S.P. Pat. No. 4,917,465, Japanese Patent Examined Publication No. 59-38565).

This liquid crystal display system is capable of providing a color display by combining the retardation values of the liquid crystal display cells with associated color polarizers. To produce colors, the system uses a substractive color mixture process by which three primary colors, cyan, yellow, and magenta, are mixed together to produce eight colors, white, cyan, magenta, blue, yellow, green, red, and black. It is also possible to produce a greater number of colors, such as 16, 64, and 128 colors, by displaying the three primary colors in various luminance and by varying their light transmittance ratios.

In the above stacked crystal display system, the three liquid crystal display parts, each comprising an STN liquid crystal cell and associated color polarizers disposed adjacent thereto, function to produce the three primary colors, cyan, yellow, and magenta, respectively. That is, a liquid crystal display part for producing cyan, a liquid crystal display part for producing yellow, and a liquid crystal display part for producing magenta are stacked one on top of another to construct the display system.

As described above, in the so-called stacked liquid crystal display system for producing a display by combining a plurality of liquid crystal display cells, the liquid crystal layers of adjacent liquid crystal display cells are separated by glass substrates, as components of the liquid crystal display cells, and a polarizer, thereby increasing the spacing between the liquid crystal layers, i.e. the spacing between the display surfaces. The resulting problem is that an apparent separation occurs between the superposed images as the angle between the observer's line of sight and the normal to the display surface area increases (the angle is hereinafter referred to as the viewing angle).

Therefore, in such stacked liquid crystal display systems, transmitted light is extracted in parallel, for example, by an overhead projector (OHP), so that the image formed on the liquid crystal display is projected in enlarged form onto a screen in front. In such a projection system, apparent separation of images due to an increase in the viewing angle can be avoided.

However, as it requires a high intensity backlight (light source) for projection of light, the power consumption increases, rendering battery operation impracticable. Furthermore, the projection system has such problems that it requires the provision of accessory optics, such as a Fresnel lens for screen projection, making the system further complex in construction and larger in size, and also that the projection for enlarged viewing lowers the image definition of the display.

These problems defeat the advantages of the liquid crystal display that is low power, can be driven by batteries, and is thin and light weight in construction, and thus limit the range of potential applications for the stacked liquid crystal display system.

SUMMARY OF THE INVENTION

It is an object of the invention to provide a liquid crystal display system that can prevent apparent separation of images due to an increase in the viewing angle.

The invention provides a liquid crystal display system for forming a display image by superposing images displayed on a plurality of liquid crystal display cells stacked one on top of another, the system comprising an optical member interposed between a first liquid crystal display cell disposed nearest to an observer of the display image and a second liquid crystal display cell disposed behind the first liquid crystal display cell, the optical member being adapted to transmit light only in a direction perpendicular to the display surfaces of the liquid crystal display cells.

In accordance with the invention, a plurality of liquid crystal display cells are provided, and an optical member adapted to transmit light only in a direction perpendicular to the display surfaces of the liquid crystal display cells is interposed between a first liquid crystal display cell disposed nearest to an observer of the display image and a second liquid crystal display cell disposed behind the first liquid crystal display cell. Because of the provision of the optical member, since the images formed on the second and subsequent liquid crystal display cells are focused onto the rear surface of the first liquid crystal display cell, there occurs no apparent separation of images due to an increase in the viewing angle. This effect has been confirmed by an experiment conducted by the present inventor.

According to the invention, a plurality of liquid crystal display cells are provided, and an optical member adapted to transmit light only in a direction perpendicular to the display surfaces of the liquid crystal display cells is interposed between a first liquid crystal display cell disposed nearest to an observer of the display image and a second liquid crystal display cell disposed behind the first liquid crystal display cell. Because of this arrangement, since the images formed on the second and subsequent liquid crystal display cells are focused on the rear surface of the first liquid crystal display cell, there occurs no apparent separation of images due to an increase in the viewing angle.

This makes it possible to incorporate the so-called stacked liquid crystal display not only into a projection system but also into a variety of other products, thus enlarging the range of applications for the liquid crystal display of this type.

The invention also provides a liquid crystal display system comprising: a first polarizer, a first liquid crystal display cell, a second polarizer, a second liquid crystal display cell, a third polarizer, a third liquid crystal display cell, and a fourth polarizer, stacked in this order; and an optical member interposed either between the first liquid crystal display cell and the second polarizer or between the second polarizer and the second liquid crystal display cell, the optical member being adapted to transmit light only in a direction perpendicular to the display surfaces of the liquid crystal display cells.

In one preferred embodiment, the first polarizer is a cyan colored polarizer; the second polarizer is a blue colored polarizer; the third polarizer is a red colored polarizer; and the fourth polarizer is a yellow colored polarizer.

In another preferred embodiment, the optical member consists of a plurality of optical fibers arranged in close proximity with their light transmitting direction oriented parallel to the direction perpendicular to the display surfaces, the entire optical member being molded into a flat panel shape.

In a further preferred embodiment, the optical member consists of a plurality of sheet-like members coated with total reflection film on both front and rear surfaces thereof and arranged parallel to each other with the total reflection film surfaces facing each other.

In a still further preferred embodiment, the optical member comprises two light guides each consisting of a plurality of sheet-like members coated with total reflection film on both front and rear surfaces thereof and arranged parallel to each other with the total reflection film surfaces facing each other, the two light guides being disposed with their planes along the longitudinal direction of the sheet-like members being arranged at right angles to each other.

BRIEF DESCRIPTION OF THE DRAWINGS

Other and further objects, features, and advantages of the invention will be more explicit from the following detailed description taken with reference to the drawings wherein:

FIGS. 2(1) and (2) are perspective views of a light guide 4 used in the liquid crystal display system 1;

FIGS. 9(1) and (2) are perspective views of a light guide 17 according to another embodiment of the invention.

DESCRIPTION OF THE PREFERRED EMBODIMENTS

Now referring to the drawing, preferred embodiments of the invention are described below.

Figure 1:
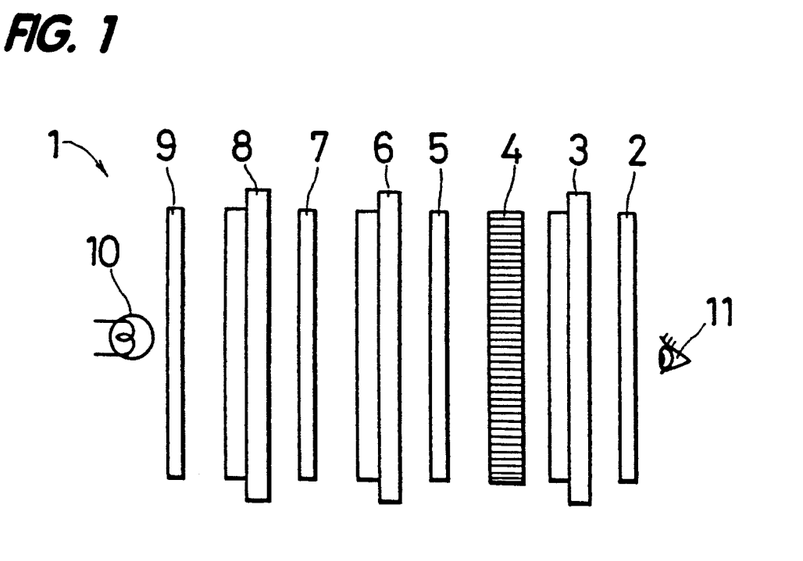
FIG. 1 is a diagram showing the construction of a liquid crystal display system 1 according to one embodiment of the invention.

FIG. 1 is a diagram showing the construction of a liquid crystal display system 1 according to one embodiment of the invention. The liquid crystal display system 1 comprises a first polarizer 2, a first liquid crystal display cell 3, a light guide 4, a second polarizer 5, a second liquid crystal display cell 6, a third polarizer 7, a third liquid crystal display cell 8, and a fourth polarizer 9, stacked in this order when viewed from the direction of an observer 11. Furthermore, a light source 10 is disposed behind the fourth polarizer 9, viewed from the direction of the observer 11.

The liquid crystal display system 1 produces the display by superposing the images such as characters and numerals formed on the first, second, and third liquid crystal display cells 3, 6, and 8. The liquid crystal display cells 3, 6, and 8 each comprise a liquid crystal layer interposed between glass substrates of 0.7 mm thickness. The liquid crystal layer is composed of STN (supertwisted nematic) liquid crystal having a twist angle of 180°. The retardation values with no voltage applied are 630 nm (spectrum) for the first liquid crystal display cell 3; 540 nm (spectrum) for the second liquid crystal display cell 6; and 438 nm (spectrum) for the third liquid crystal display cell 8.

The light guide 4 consists of a plurality of optical fibers arranged in close proximity and molded into a flat panel shape, as shown in FIG. 2(1). Each optical fiber is a step-index fiber and consists of a core 15 of polymethyl methacrylate (PMMA) and a cladding 16 of fluorocarbon resin. The diameter of each optical fiber is chosen to be 1 mm or smaller, while the thickness of the light guide 4 after molding is chosen to be 10 mm. The same effect can be obtained whether the light guide 4 is positioned on the front side or the rear side of the second polarizer 5, viewed from the direction of the observer 11, but it is preferable to place it on the front side.

Figure 3:
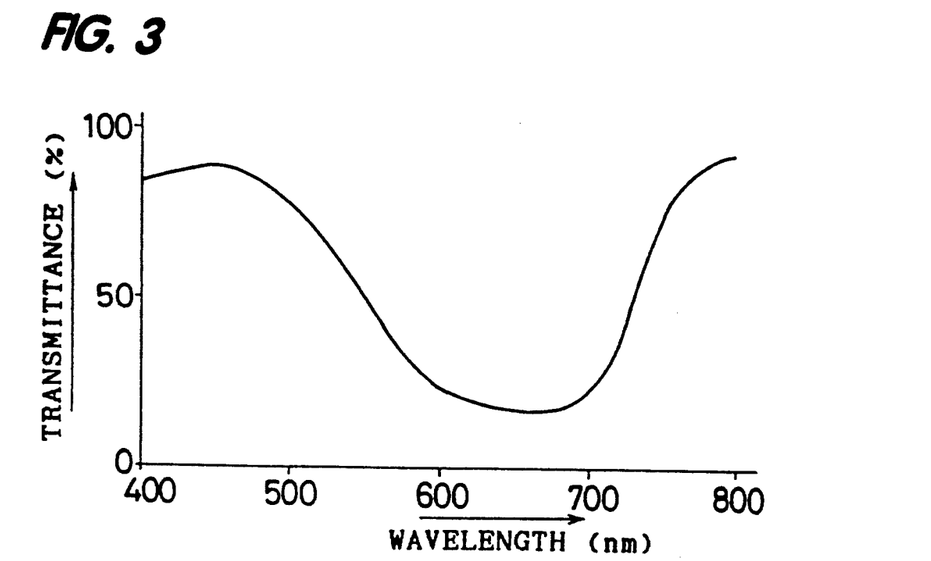
FIG. 3 is a graph showing the spectral transmittance of a first polarizer 2 used in the liquid crystal display system 1.
Figure 4:
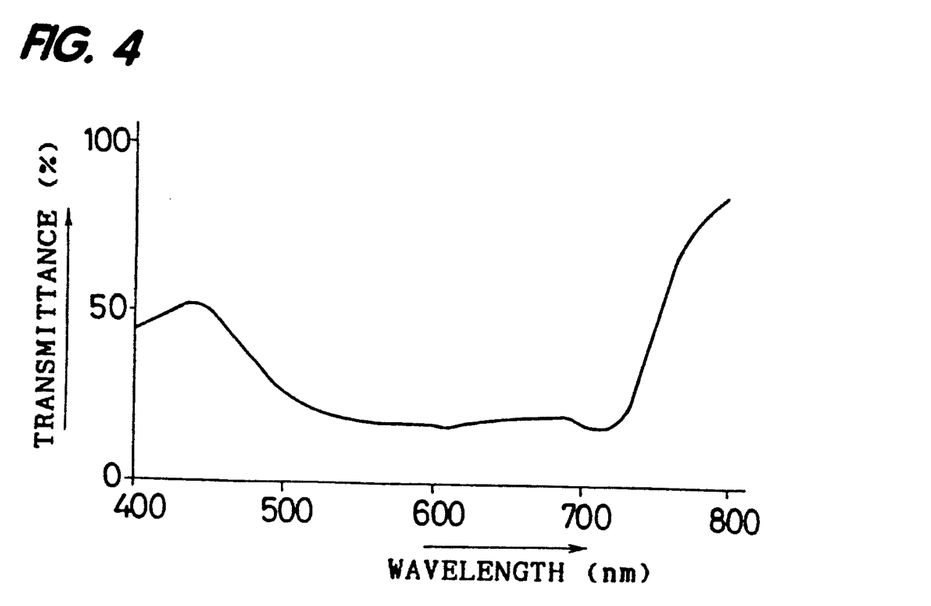
FIG. 4 is a graph showing the spectral transmittance of a second polarizer 5 used in the liquid crystal display system 1.
Figure 5:
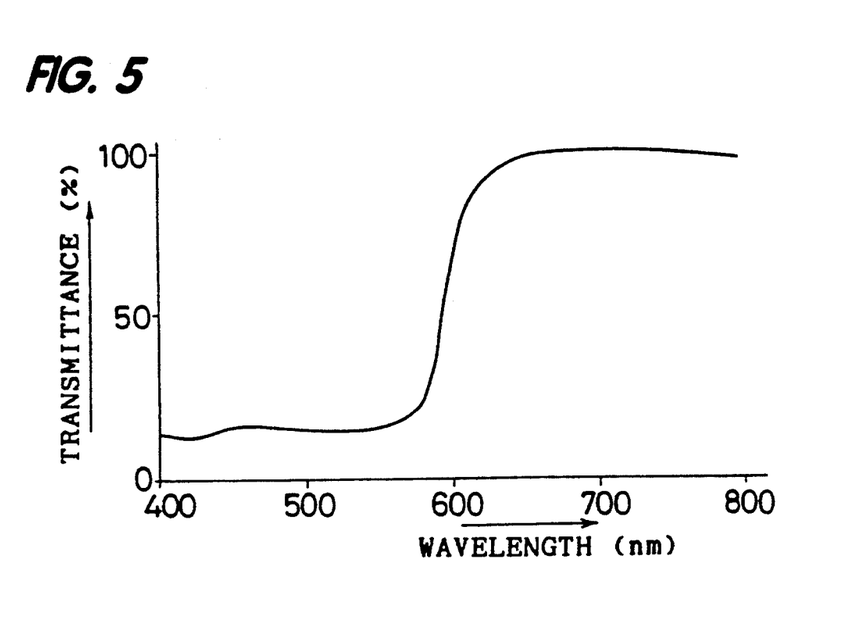
FIG. 5 is a graph showing the spectral transmittance of a third polarizer 7 used in the liquid crystal display system 1.
Figure 6:
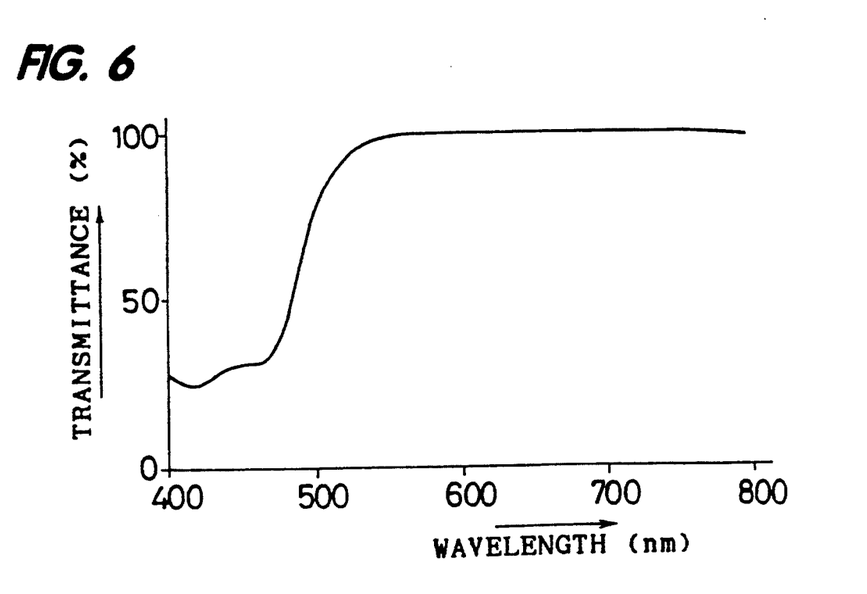
FIG. 6 is a graph showing the spectral transmittance of a fourth polarizer 9 used in the liquid crystal display system 1.

In the light guide 4 of the above construction, the incident light travels down the length of the fiber while undergoing total reflection at the interface between the cladding 16 of low refractive index and the core 15 of high refractive index. In this embodiment, the first polarizer 2 is a cyan colored polarizer having the spectral transmittance shown in FIG. 3, the second polarizer 5 is a blue colored polarizer having the spectral transmittance shown in FIG. 4, the third polarizer 7 is a red colored polarizer having the spectral transmittance shown in FIG. 5, and the fourth polarizer 9 is a yellow colored polarizer having the spectral transmittance shown in FIG. 6.

Figure 7:
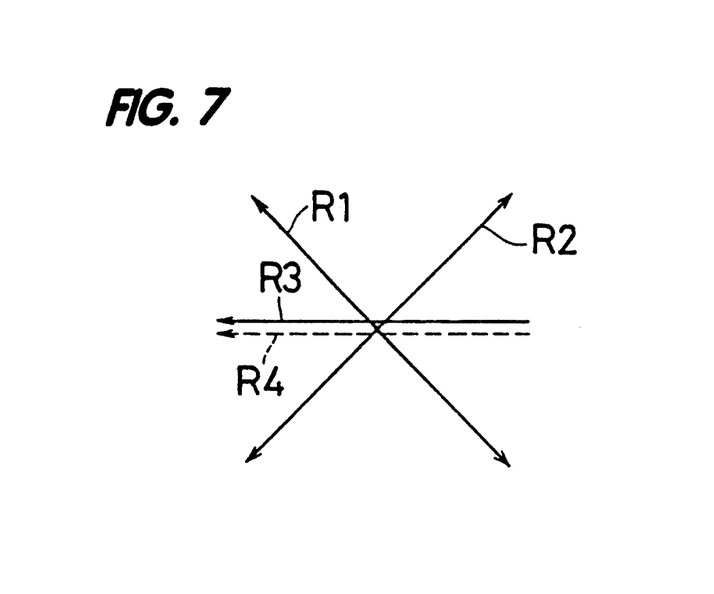
FIG. 7 is a diagram showing the orientations of component members of the liquid crystal display system 1.

FIG. 7 is a diagram showing the orientations of the light transmitting axes of the polarizers, in relation to the orientations of the liquid crystal molecules, in the liquid crystal display system 1. The arrow R1 designates the light transmitting axes of the first and third polarizers 2 and 7, while the arrow R2 indicates the light transmitting axes of the second and fourth polarizers 5 and 9. The arrow R3 shows the orientation of the liquid crystal molecules in the front side area of each of the liquid crystal display cells 3, 6, and 8, viewed from the direction of the observer 11, and the arrow R4 represents the orientation of the liquid crystal molecules in the rear side area thereof, viewed from the direction of the observer 11.

Figure 8:
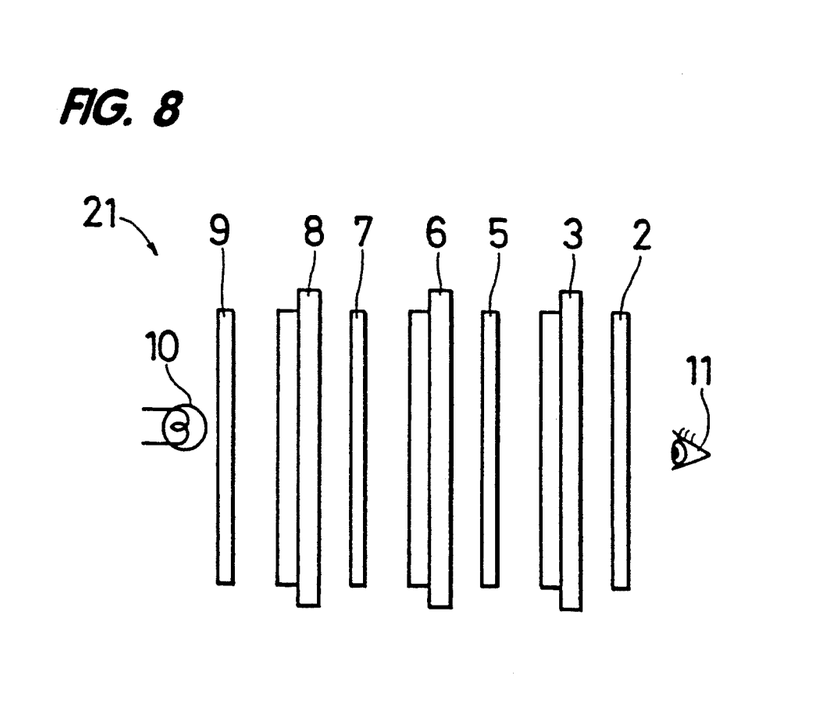
FIG. 8 is a diagram showing the construction of a liquid crystal display system 21 as a comparative example related to the invention.

FIG. 8 shows the construction of a liquid crystal display system 21 as a comparative example. Except that the light guide 4 is omitted, the liquid crystal display system 21 is identical in both construction and component disposition to the liquid crystal display system 1 shown in FIG. 1. Both liquid crystal display systems 1 and 21 are capable of producing colors utilizing the principle of subtractive color mixture. White color can be produced by putting all the liquid crystal display cells 3, 6, and 8 in the ON state.

In the liquid crystal display system 21 that produces the display by combining a plurality of liquid crystal display cells (in this example, three cells), there occurs an apparent separation of images as the viewing angle increases (the viewing angle is the angle that the line of sight of the observer 11 makes with the display surface of each liquid crystal display cell). This is because the spacing between the liquid crystal layers of adjacent liquid crystal display cells, i.e. the spacing between adjacent display surfaces, is increased by the thicknesses of the glass substrates, as components of the liquid crystal display cells, and the thickness of the polarizer interposed therebetween. When the spacing between the display surfaces is denoted as L, the magnitude of image separation as W, and the viewing angle as $\theta$, the following equation is given.

$$\theta = \tan^{-1} W/L \qquad \text{[Equation 1]}.$$

When the glass substrate thickness is set at 1.1 mm and 0.7 mm, and the magnitude of image separation is set at 100 μm, 200 μm, and 300 μm, respectively, the viewing angles for the respective values are given as shown in Table 1 (the polarizer thickness and liquid crystal layer thickness are disregard).

TABLE 1

| W | L | | | |
|---|---|---|---|---|
| | 0.7 mm | 1.1 mm | 1.4 mm | 2.2 mm |
| 100 μm | 8.1° | 5.2° | 4.1° | 2.6° |
| 200 μm | 15.9° | 10.3° | 8.1° | 5.2° |
| 300 μm | 23.2° | 15.3° | 12.1° | 7.8° |

Assuming that the spacing between the display surfaces is 0.7 mm and the image separation is acceptable up to 300 μm, a liquid crystal display up to the size of B5 will be acceptable when the liquid crystal display is to be viewed at a distance of 30 cm. However, this cannot be realized because of a lower limit to the practical thickness of the glass substrate.

As shown in FIG. 1 illustrating the construction of the liquid crystal display system 1, the light guide 4 adapted to permit transmitted light to pass only in the direction perpendicular to the display surfaces of the liquid crystal display cells is interposed between the first liquid crystal display cell 3 disposed nearest to the observer 11 and the second liquid crystal display cell 6 disposed behind the first liquid crystal display cell 3. It has been confirmed by an experiment conducted by the present inventor that this arrangement serves to prevent the image separation from occurring.

The light guide 4 only passes the light transmitted in the direction perpendicular to the second and third liquid crystal display cells 6 and 8 and projects the light onto the rear of the first liquid crystal display cell 3. As a result, the images formed on the second and third liquid crystal display cells 6 and 8 are all focused through the light guide 4 onto the surface (rear) of the first liquid crystal display cell 3, thus preventing the image separation. The number of liquid crystal display cells to be disposed behind the light guide 4 is not limited to two, but the same effect can be obtained when three or more cells are disposed behind it.

Figure 2A:
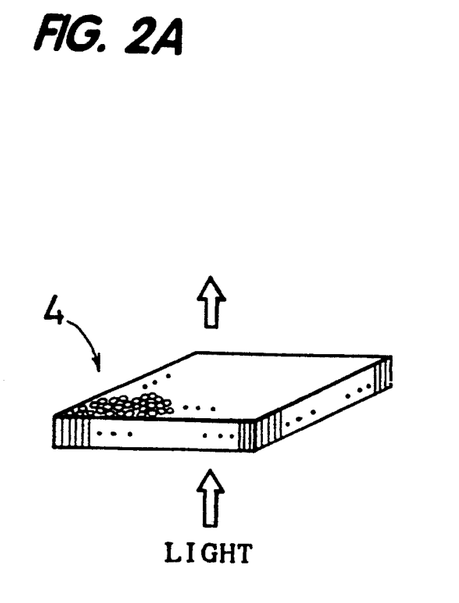
Figure 2B:
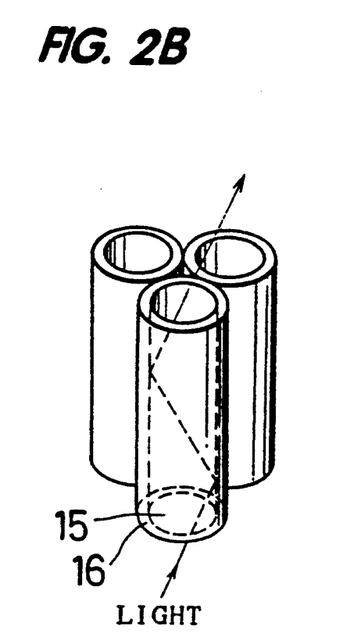

In the light guide 4 consisting of step-index optical fibers as shown in FIG. 2, the incident light travels down the length of the fiber while undergoing total reflection at the interface between the cladding 16 of low refractive index and the core 15 of high refractive index; therefore, the images formed on the second and third liquid crystal display cells 6 and 8 can be focused onto the rear surface of the first liquid crystal display cell 3.

Consequently, even when the liquid crystal display system 1 is viewed obliquely, since the images on the second and third liquid crystal display cells 6 and 8 are focused through the light guide 4 onto the rear surface of the first liquid crystal display cell 3, there occurs on image separation against the image formed on the first liquid crystal display cell 3. An adequate effect can be obtained when the diameter of each optical fiber of the light guide 4 is chosen to be 1 mm or smaller.

The liquid crystal display system 1 provides a viewing angle of more than 20° from the vertical. With this viewing angle, there occurs no image separation on a B5-size screen when the screen is viewed from a distance of 30 cm, and the construction is effective even for a 640×480-dot VGA compatible dot-matrix liquid crystal display system.

Figure 9A:
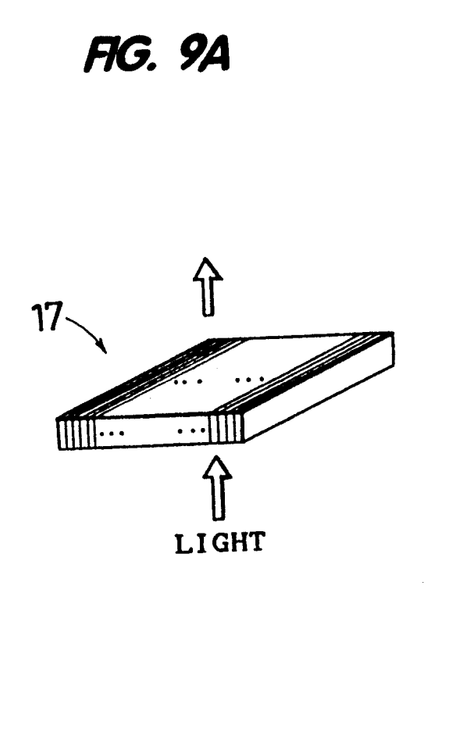
Figure 9B:
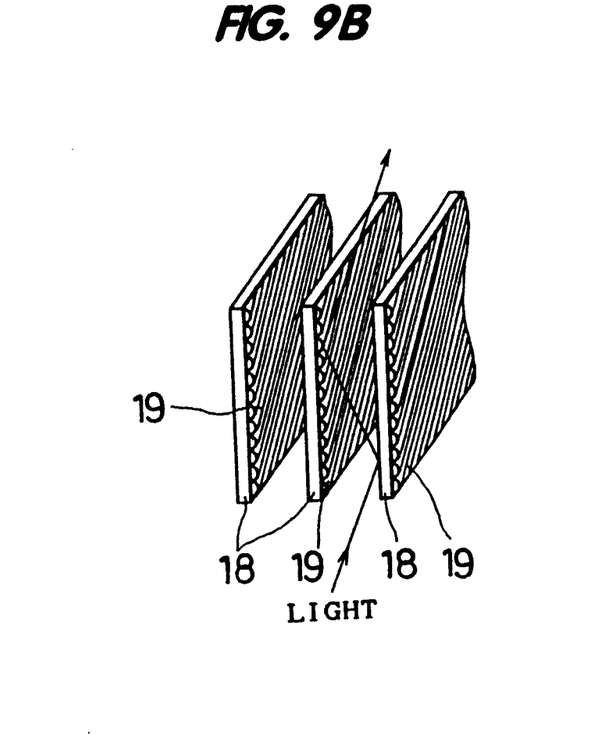
Figure 10:
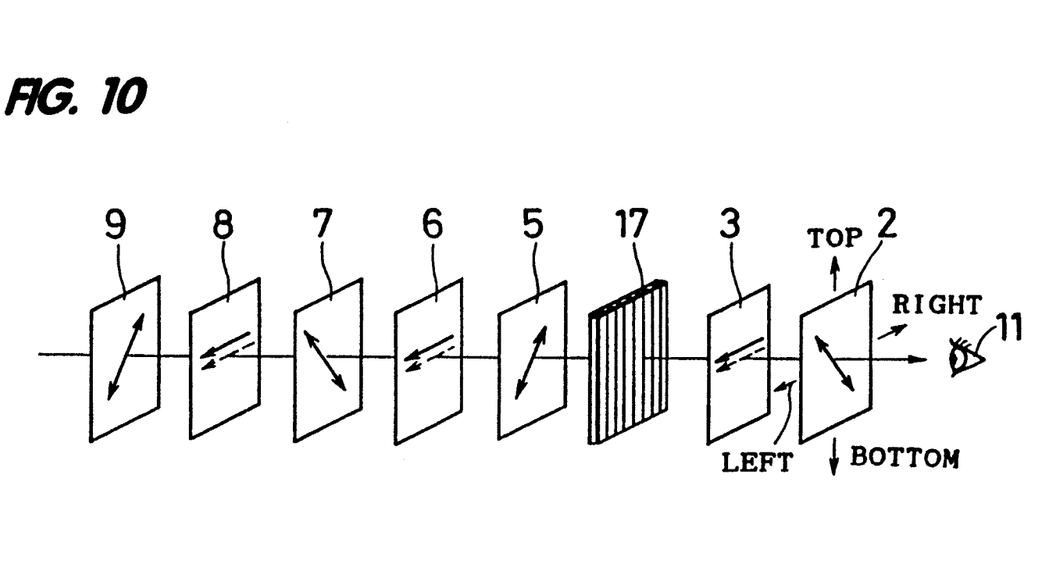
FIG. 10 is a diagram showing the orientations of component members of a liquid crystal display system incorporating the light guide 17.

FIG. 9 is a diagram for explaining another embodiment of the invention. The feature of this embodiment is that the foregoing light guide 4 is replaced by a light guide 17 which is shown in FIG. 9(1). The light guide 17 consists of a plurality of polymethyl methacrylate (PMMA) sheets 18 stacked in parallel to the light transmitting direction, the PMMA sheets 18 having surfaces coated with total reflection film 19 formed from aluminum or the like. The thickness of each PMMA film 18 is chosen to be 0.5 to 0.7 mm, while the thickness of the light guide 17 is selected as 5 mm. The light guide 17 may be positioned either behind or in front of the second polarizer 5, as in the foregoing embodiment of FIG. 1, but it is preferable to place it in front.

Unlike the light guide 4 consisting of step-index optical fibers, the light guide 17 has directionality; that is, in certain directions, the incident light travels down the path while undergoing total reflection, but in other directions, no total reflection occurs. It is therefore preferable to use two light guides 17 stacked one on top of the other, their planes along the longitudinal direction of the PMMA sheets 18 being arranged at right angles to each other. The following description of this embodiment, however, deals with the arrangement in which only one light guide 17 is used.

Generally, the display screen of a liquid crystal display is wider in horizontal directions as viewed from the observer 11, which means a greater viewing angle in horizontal directions. Therefore, the light guide 17 is positioned so that the directions in which total reflection takes place coincides with the horizontal directions of the display screen. Effective viewing angles were measured for the thus configured liquid crystal display, and the results showed that the viewing angle in horizontal directions was 20° or greater, whereas the viewing angle in vertical directions was about 5°. Therefore, the light guide 17 of this embodiment must be positioned considering its directionality.

As described above, in either embodiment, the liquid crystal display is capable of producing a clear display image as the observer 11 can directly view the display screen of the liquid crystal display, as opposed to a projection display by a projection system.

When the liquid crystal display of either of the above embodiments is used as a transmission type liquid crystal display, sufficient brightness can be obtained using one or two cold cathode fluorescent tubes (CCFTs) as a source of backlighting. For example, when two CCFTs are used as a source of backlighting from the edges (sides), the luminance of the backlighting itself is 654 nt (nit), which is transmitted through the liquid crystal display with a resulting luminance of 30 to 40 nt, providing sufficient brightness for the display. Thus, the liquid crystal display of the invention incorporating a backlight system provides a liquid crystal unit (module) having low power consumption, making it possible to operate on batteries.

Furthermore, when compared with projection systems, only one light guide is needed, which serves to further simplify the construction of the liquid crystal unit and reduce the thickness and overall size of the unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A liquid crystal display system comprising:
   a first polarizer, a first liquid crystal display cell, a second polarizer, a second liquid crystal display cell, a third polarizer, a third liquid crystal display cell, and a fourth polarizer, stacked in this order, each of the liquid crystal display cells including a liquid crystal layer interposed between two substrates; and
   an optical member interposed between the first liquid crystal display cell and the second liquid crystal display cell, including a plurality of optical fibers arranged in close proximity and in parallel, with their light transmitting direction perpendicular to display surfaces of the plurality of liquid crystal display cells, the entire optical member being molded into a flat panel shape, wherein the optical member transmits light only in a direction substantially perpendicular to the display surfaces of the liquid crystal display cells.

2. The liquid crystal display system of claim 1, wherein each optical fiber is a step index fiber.

3. The liquid crystal display system of claim 1, wherein each optical fiber includes a core having a high refractive index and a cladding having a low refractive index.

4. The liquid crystal display system of claim 1, wherein each optical fiber includes a core of polymethyl methacrylate and a cladding of fluorocarbon resin.

5. A liquid crystal display system comprising:
   a first polarizer, a first liquid crystal display cell, a second polarizer, a second liquid crystal display cell, a third polarizer, a third liquid crystal display cell, and a fourth polarizer, stacked in this order, each of the liquid crystal display cells having a liquid crystal layer interposed between two substrates; and
   an optical member interposed between the first liquid crystal display cell and the second liquid crystal display cell, including a plurality of optical fibers arranged in close proximity and in parallel, with their light transmitting direction perpendicular to display surfaces of the plurality of liquid crystal display cells, the entire optical member being molded into a flat panel shape, wherein the optical member transmits light only in a direction substantially perpendicular to the display surfaces of the liquid crystal display cells, wherein the first polarizer is a cyan colored polarizer; the second polarizer is a blue colored polarizer; the third polarizer is a red colored polarizer; and the fourth polarizer is a yellow colored polarizer.

6. A liquid crystal display system for forming a display image by superposing images displayed on a plurality of liquid crystal display cells stacked one on top of another, comprising:
   an optical member interposed between a first liquid crystal display cell disposed nearest to an observer of the display image and a second liquid crystal display cell disposed behind the first liquid crystal display cell, the optical member transmitting light only in a direction perpendicular to the display surfaces of the liquid crystal display cells, wherein the optical member includes a plurality of sheet-like members coated with total reflection film on both front and rear surfaces thereof and arranged parallel to each other with the total reflection film surfaces facing each other.

7. The liquid crystal display system according to claim 6, wherein the plurality of sheet-like members consist of polymethyl methacrylate sheets.

8. A liquid crystal display system for forming a display image by superposing images displayed on a plurality of liquid crystal display cells stacked one on top of another, comprising:
   an optical member interposed between a first liquid crystal display cell disposed nearest to an observer of the display image and a second liquid crystal display cell disposed behind the first liquid crystal display cell, the optical member transmitting light only in a direction perpendicular to the display surfaces of the liquid crystal display cells, wherein the optical member comprises tow light guides each consisting of a plurality of sheet-like members coated with total reflection film of both front and rear surfaces thereof and arranged parallel to each other with the total reflection film surfaces facing each other.

9. The liquid crystal display system according to claim 8, wherein the two light guides disposed with their planes along the longitudinal direction of the sheet-like members are arranged at right angles to each other.

10. The liquid crystal display system according to claim 8, wherein the plurality of sheet-like members consist of polymethyl methacrylate sheets.

11. A liquid crystal display system for forming a display image by superposing images displayed on plurality of liquid crystal display cells stacked one on top of another, each liquid crystal display cell having a liquid crystal layer interposed between two substrates, comprising:
   an optical member interposed between a first liquid crystal display cell disposed nearest to an observer of the display image and a second liquid crystal display cell disposed behind the first liquid crystal display cell, including a plurality of optical fibers arranged in close proximity and in parallel, with their light transmitting direction perpendicular to display surfaces of the plurality of liquid crystal display cells, the entire optical member being molded into a flat panel shape, wherein the optical member transmits light only in a direction substantially perpendicular to the display surfaces of the liquid crystal display cells, wherein the plurality of stacked liquid crystal display cells includes a first polarizer, a first liquid crystal display cell, a second polarizer, a second liquid crystal display cell, a third polarizer, a third liquid crystal display cell, and a fourth polarizer, stacked in this order, and wherein the optical member is interposed between the first liquid crystal display cell and the second polarizer.

12. A liquid crystal display system for forming a display image by superposing images displayed on a plurality of liquid crystal display cells stacked one on top of another, each liquid crystal display cell having a liquid crystal layer interposed between two substrates comprising:

an optical member interposed between a first liquid crystal display cell disposed nearest to an observer of the display image and a second liquid crystal display cell disposed behind the first liquid crystal display cell, including a plurality of optical fibers arranged in close proximity and in parallel, with their light transmitting direction perpendicular to display surfaces of the plurality of liquid crystal display cells, the entire optical member being molded into a flat panel shape, wherein the optical member transmits light only in a direction substantially perpendicular to the display surfaces of the liquid crystal display cells, wherein the plurality of stacked liquid crystal display cells include a first polarizer, a first liquid crystal display cell, a second polarizer, a second liquid crystal display cell, a third polarizer, a third liquid crystal display cell, and a fourth polarizer, stacked in this order, and wherein the optical member is interposed between the second polarizer and a second liquid crystal display cell.

13. A liquid crystal display system comprising:

a first polarizer, a first liquid crystal display cell, a second polarizer, a second liquid crystal display cell, a third polarizer, a third liquid crystal display cell, and a fourth polarizer, stacked in this order, each liquid crystal display cell having a liquid crystal layer interposed between two substrates, and an optical member interposed between the first and the second liquid crystal display cell including a plurality of optical fibers arranged in close proximity with their light transmitting direction oriented parallel to the direction perpendicular to display surfaces of the plurality of liquid crystal display cells, the entire optical member being molded into a flat panel shape, wherein the optical member transmits light only in a direction substantially perpendicular to the display surfaces of the liquid crystal display cells.

14. A liquid crystal display system comprising:

a first polarizer, a first liquid crystal display cell, a second polarizer, a second liquid crystal display cell, a third polarizer, a third liquid crystal display cell, and a fourth polarizer, stacked in this order, each liquid crystal display cell having a liquid crystal layer interposed between two substrates, and an optical member interposed between the first and second liquid crystal display cells including a plurality of optical fibers arranged in close proximity with their light transmitting direction oriented parallel to the direction perpendicular to display surfaces of the plurality of liquid crystal display cells, the entire optical member being molded into a flat panel shape, wherein the optical member transmits light only in a direction substantially perpendicular to the display surfaces of the liquid crystal display cells, wherein the first polarizer is a cyan colored polarizer, the second polarizer is a blue colored polarizer, the third polarizer is a red colored polarizer and the fourth polarizer is a yellow colored polarizer.

15. A liquid crystal display system comprising:

a first polarizer, a first liquid crystal display cell, a second polarizer, a second liquid crystal display cell, a third polarizer, a third liquid crystal display cell, and a fourth polarizer, stacked in this order, each liquid crystal display cell having a liquid crystal layer interposed between two substrates, and an optical member interposed between the first and second liquid crystal display cells including a plurality of optical fibers arranged in close proximity with their light transmitting direction oriented parallel to the direction perpendicular to display surfaces of the plurality of liquid crystal display cells, the entire optical member being molded into a flat panel shape, wherein the optical member transmits light only in a direction substantially perpendicular to the display surfaces of the liquid crystal display cells, wherein each optical fiber is a step fiber and includes a core of polymethyl methacrylate and a cladding of fluorocarbon resin.

* * * * *